United States Patent [19]

Piesinger

[11] 4,152,702

[45] May 1, 1979

[54] ADAPTIVE ANTENNA LOBING ON SPREAD SPECTRUM SIGNALS AT NEGATIVE S/N

[75] Inventor: Gregory H. Piesinger, Scottsdale, Ariz.

[73] Assignee: Motorola, Inc., Schaumburg, Ill.

[21] Appl. No.: 877,133

[22] Filed: Feb. 13, 1978

[51] Int. Cl.$^2$ ............................................ H04B 7/00

[52] U.S. Cl. ........................ 343/100 SA; 343/100 LE; 343/100 CL; 343/854

[58] Field of Search .................. 343/100 SA, 100 CL, 343/100 LE, 854

[56] References Cited

U.S. PATENT DOCUMENTS 3,763,490 10/1973 Hadley et al. ................ 343/100 LE

*Primary Examiner*—Theodore M. Blum

*Attorney, Agent, or Firm*—Eugene A. Parsons

[57] ABSTRACT

In a communications system including a multiple antenna array with null steering apparatus, a desired signal and an identifier signal are transmitted, the desired signal including a first carrier modulated with bits of data delayed a predetermined period and with a random code and the identifier signal being substantially reduced in amplitude relative to the desired signal and including a second carrier in phase quadrature with the first carrier and modulated with the bits of data and with the random code, which transmitted signal is received in the null steering apparatus where the data from the identifier signal, which leads the data of the desired signal, is utilized to modulate the recovered first carrier and is adjusted in amplitude to cause the null steering apparatus to lobe on the desired signal, the remodulated carrier being utilized as a reference signal in the feedback circuits of the null steering apparatus.

8 Claims, 2 Drawing Figures

ADAPTIVE ANTENNA LOBING ON SPREAD SPECTRUM SIGNALS AT NEGATIVE S/N

BACKGROUND OF THE INVENTION

Null steering or adaptive noise cancelling is a procedure which has been known for many years and is described, for example, in such typical articles as "Adaptive Antenna Systems", by B. Widrow et al, Proceeding of the IEEE, Volume 55, No. 12, December 1967, and "Adaptive Noise Cancelling: Principles and Applications", by B. Widrow et al, Proceeding of the IEEE, Volume 63, No. 12, December 1975. In general, null steering is a technique whereby two or more antenna signals are weighted and summed together to form a composite antenna pattern. The pattern is formed in such a manner as to create antenna pattern nulls in the direction of the jamming signals and lobes in the direction of desired signals. Using null steering techniques, nulls on the order of 50 dB can be automatically steered in the direction of a jamming signal.

Using, for example, a four channel null steerer, each antenna signal is split into an in-phase component and a quadrature component with a ninety degree hybrid circuit or the like. The two signal components are then weighted and summed together along with the signal components from the other antenna weighters, in a final summing circuit. By using a ninety degree hybrid circuit and weighters, a single phasor (any specific signal on an antenna can be represented by a phasor) on a particular antenna can be shifted to any new phase and amplitude desired. If a jamming signal, or any other undesired signal, is present on two antennas, for example, the null steerer will shift the two signals (phasors) such that they are of equal amplitude and opposite phase. When these two weighted signals are then summed together in the final summing circuit, they will cancel, thereby forming an antenna pattern null in the direction of the jamming signal. The process is similar when the jamming signal is present on all four antennas. The number of independent nulls that can be formed is equal to N-1 where N is the number of antennas.

The values of the weighters are automatically adjusted by feeding back the output of the final summing circuit to a correlator or mixer, which mixes the output with each of the signal components from the antenna, which are non-weighted, thereby creating a correlation voltage. This correlation voltage is integrated and used to drive the specific weighter for that antenna component. The weighters are always driven in such a manner as to minimize the feedback signal. When the feedback signal is completely eliminated, corresponding to forming a complete null, the output of the correlator is zero and the system has fully adapted. A null steerer implemented in this manner will null out all signals as long as the number of signals is equal to or less than N-1.

To prevent nulling of desired signals, a reference signal must be used. A copending application entitled "Null Steering Apparatus For a Multiple Antenna Array", Ser. No. 744,008, filed Nov. 22, 1976 and assigned to the same assignee describes apparatus for providing such a reference signal. Also, a technical report from the Ohio State University Research Foundation, entitled "An Adaptive Array For Interference Rejection in a Coded Communication System", by K. L. Reinhard, dated May, 1972, discloses apparatus for producing such a reference signal from the output of the processor. The major difficulty with this apparatus is the fact that the reference signal is not in-phase with the desired signal and, therefore, the operation of the null steering apparatus lags the reception of the desired signal resulting in a reduction of the signal to noise ratio in the waveform processor.

SUMMARY OF THE INVENTION

The present invention pertains to a communication system including apparatus for simultaneously transmitting a desired signal, including a first carrier modulated with bits of data delayed a predetermined period and with a random code, and an identifier signal substantially reduced in amplitude relative to the desired signal, including a second carrier in-phase quadrature with the first carrier and modulated with the bits of data and with the random code, and apparatus for reception of the transmitted signals including a multiple antenna array having connected thereto null steering apparatus with a first feedback path for directing a null in the direction of all signals therein and a second feedback path limited to the transmitted signals by the random code and operating on the identifier signal to produce a reference signal which is identical to the desired signal and in-phase therewith so that the apparatus will direct a lobe in the direction of the desired signal.

It is an object of the present invention to provide new and improved null steering apparatus for use in conjunction with a multiple antenna array in a communication system.

It is a further object of the present invention to provide apparatus for producing a reference signal in null steering apparatus which is an exact duplicate of the desired signal and is in-phase with the desired signal for directing a lobe of a multiple antenna array in the direction of the desired signal.

These and other objects of this invention will become apparent to those skilled in the art upon consideration of the accompanying specification, claims and drawings.

DESCRIPTION OF THE DRAWINGS

Referring to the drawings.

DESCRIPTION OF THE PREFERRED EMBODIMENT

Figure 1:
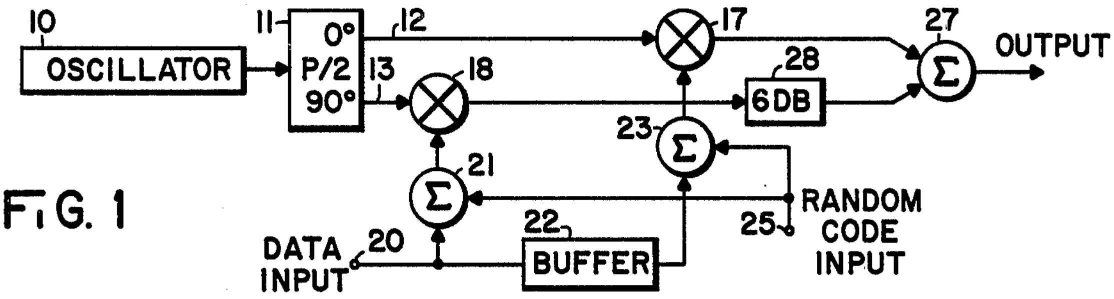
FIG. 1 is a simplified block diagram of transmission apparatus for use in a communications system embodying the present invention.

Referring specifically to FIG. 1, a simplified block diagram of transmitting apparatus is illustrated. The numeral 10 designates an oscillator designed to produce a desired radio frequency signal for transmission. The output of the oscillator is supplied to a power divider or quadrature phase splitter 11 which provides an in-phase carrier or RF signal at an output 12 and a quadrature carrier or RF signal at an output 13. The in-phase carrier from the output 12 is applied to one input of a multiplier or modulator 17 and the quadrature carrier at the output 13 is supplied to one input of a multiplier or modulator 18. An input 20 is adapted to receive bits of data which it is desired to transmit. The input 20 is connected to one input of a summing device 21 and through a buffer 22 to one input of a second summing device 23. The buffer 22 delays the data applied to the summing device 23 by a predetermined amount which may be, for example, 10 or 15 bits. A second input 25 is adapted to receive a random code, for example a PN code, and supply the code to second inputs of the summing devices 21 and 23. The output signal from the device 21 is applied to a second input of the multiplier or modulator 18 and the output of the summing device 23 is applied to a second input of the multiplier or modulator 17. As is well known in the art, the random code is utilized to spread the spectrum of the output signal so that only a receiver having the correct random code can receive and detect the signal. For example, the data input at terminal 20 may be a 16 K bit data stream and the random code may be a 5 M bit PN code.

The modulated carrier at the output of the multiplier 17 is applied to one input of a summing device 27 and the modulated carrier at the output of the multiplier 18 is applied through an attenuator, in this embodiment 6 dB attenuator 28, to a second input of the summing device 27. The signal at the output of the summing device 27 is then ready for transmission. This signal consists of a desired signal which includes a first, or in-phase, carrier modulated with bits of data delayed a predetermined period and with a random code and an identifier signal, substantially reduced in amplitude relative to the desired signal, and including a second carrier in-phase quadrature with the first carrier and modulated with the bits of data and with the random code.

Figure 2:
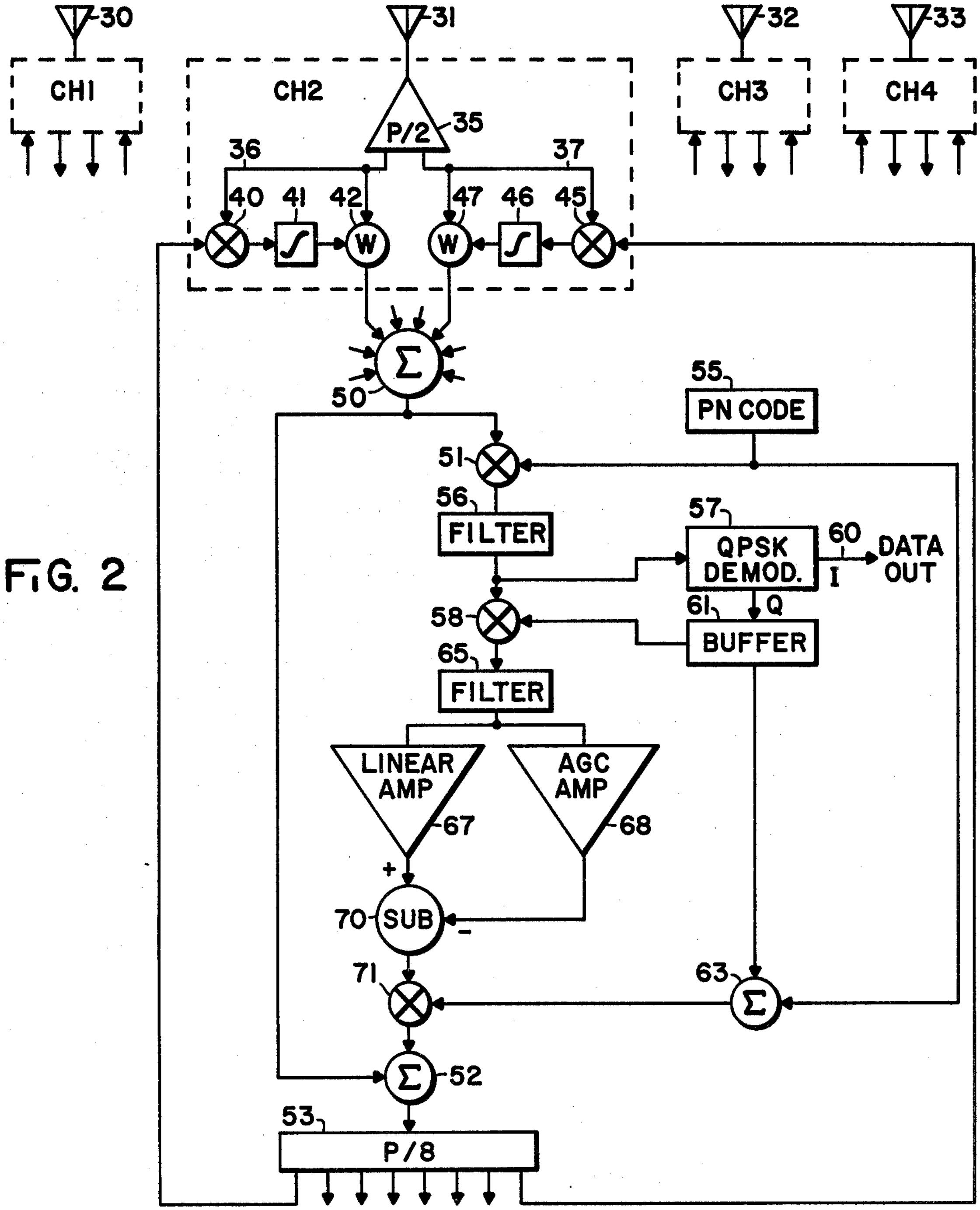
FIG. 2 illustrates a simplified block diagram of a multiple antenna array having null steering apparatus connected thereto which embodies the present invention.

Referring specifically to FIG. 2, a multiple antenna array is illustrated, consisting of four antennas designated 30–33. Any specific signal on any one of the antennas 30–33 can be represented by a phasor and each antenna has associated therewith electronics, designated channel 1 through channel 4, for manipulating the signal so that the phasor has substantially any desired amplitude and phase. Each of the channels 1 through 4 are identical and, therefore, only channel 2 will be described in detail and it should be understood that each of the remaining channels operates in a similar fashion and contains similar apparatus. It should also be understood that the apparatus illustrated is only exemplary of one type of apparatus providing null steering and those skilled in the art may devise other apparatus which will operate to provide the null steering function, which apparatus is within the scope of this invention.

A ninety degree hybrid, or phase splitter, 35 is connected to receive the signals from antenna 31 and supply in-phase and quadrature components thereof on lines 36 and 37, respectively. It should be understood that circuitry can be interposed between the antennas and the phase splitters to alter the frequency of the incoming signal, e.g., IF type circuitry. The line 36, transmitting the in-phase component, is connected to one input of a correlator, which may be a mixer or multiplier 40, that provides a signal at an output thereof which is representative of the correlation between the signal applied from the line 36 and a signal applied to a second input of the correlator 40. Output signals from the correlator 40 are integrated in an integrator 41 and applied to a control input of a weighting circuit 42, a second input of which is connected to the line 36. The weighting circuit 42 may be, for example, a variable amplifier or attenuator wherein the signal from the integrator 41 adjusts the amplitude, or weight, of the signal passing through the weighting circuit 42 from the line 36 and the phase can be changed 0° or 180° also. In a similar fashion, the line 37 is connected to one input of a correlator 45, which correlator 45 has an output connected through an integrator 46 to the control input of a weighting circuit 47. The weighting circuit 47 also has an input connected to the line 37. The correlator 45, integrator 46 and weighting circuit 47 are substantially identical to the correlator 40, integrator 41 and weighting circuit 42, respectively.

The outputs of the weighting circuits 42 and 47, as well as similar outputs from channels 1, 3 and 4, are applied to a summing circuit 50. The summing circuit 50 has a single output which is connected directly to one input of a multiplier 51 (to be described presently) and one input of a summing circuit 52. The summing circuit 52 has a single output which is applied through a power splitter 53 to each of the second inputs of the correlators 40, 45, and the two correlators in each of the channels 1, 3 and 4. Signals from the antenna 31 are split into an in-phase component and a quadrature component in the phase splitter 35. The two signal components are then weighted by the weighting circuits 42 and 47 and summed together, along with the signals from the other antenna weighters, in the summing circuit 50. The values of the weighting circuits 42 and 47 are automatically adjusted by feeding back the output of the summing circuit 50 through the summing circuit 52 and the power splitter 53 to the correlators 40 and 45. The feedback signal is correlated with the non-weighted signal from the phase shifter 35 to create a correlation voltage which is integrated and used to drive the weighting circuits 42 and 47. The weighting circuits 42 and 47 are always driven in such a manner as to minimize the feedback signal. When the feedback signal is completely eliminated, corresponding to forming a complete null, the output of the correlators 40 and 45 is zero and the system has fully adapted. If the desired signal has a negative signal to noise ratio, it will be buried in the noise and will remain at approximately the same ratio as the noise or other unwanted signals are nulled.

The feedback path including the direct connection between the summing device 50 and the summing device 52 will tend to null out any strong signal appearing in the system. However, a second feedback path is provided, by way of the mixer 51, which will accept the previously described transmitted signals even though they are at a negative signal to noise ratio, and amplify them so that they are usable. The following apparatus is associated with or included in the second feedback path. A random code generator, such as the PN code generator 55, provides an output which is connected to a second input of the multiplier 51. The output of the multiplier 51 is connected through a narrow band filter 56 (in this embodiment filter 56 has approximately a 32 kilahertz bandpass) to one input of a QPSK demodulator 57 and one input of a multiplier 58. At least two different types of QPSK demodulation is known in the art and any of several well known demodulators may be utilized. The in-phase output of the demodulator 57 is supplied to a terminal 60 which is the output terminal for the null steering apparatus. The quadrature output of the demodulator 57 is applied through a buffer 61 to a second input of the multiplier 58 and to one input of a summing device 63. Since the quadrature data output from the demodulator 57 leads the input data the buffer 61 is utilized to delay the quadrature data sufficiently to collapse the data modulated in-phase carrier from the filter 56 (the desired signal) in the multiplier 58. Thus, the data which was modulating the quadrature carrier and leading the data modulating the in-phase carrier is delayed sufficiently so that it is in-phase with the data modulating the in-phase carrier. The random code generated in the generator 55 is also supplied to a second input of the summing device 63. The output of the multiplier 58 is applied through a narrow band filter 65 (in this embodiment filter 65 has a bandwidth of approximately 1 kilahertz) to inputs of a linear amplifier 67 and an AGC amplifier 68. The output of the linear amplifier 67 is applied to a positive input of a subtractor 70 and the output of the AGC amplifier 68 is applied to a negative input thereof. The output of the subtractor 70 is applied to one input of a multiplier or modulator 71, a second input of which is connected to the output of the summing device 63. The output of the multiplier 71 is connected to one input of the summing device 52 to complete the second feedback path.

The wide band spread spectrum signal, transmitted as previously described, at the output of the summing device 50 is collapsed, or demodulated, in the mixer 51 by the locally generated random code and only the collapsed desired signal and identifier signal will pass through the narrow band filter 56. The desired signal (which is the in-phase carrier modulated with data) and the identifier signal (which is the quadrature carrier modulated with data) are demodulated in the demodulator 57 to supply the in-phase and quadrature data outputs. The quadrature data output is delayed in the buffer 61 and supplied to the multiplier 58 to collapse the desired signal into only the in-phase carrier. The identifier signal is also present at the multiplier 58 but is at a much lower amplitude and is eliminated by the filter 65. Since the data from the buffer 61 is in-phase with the data modulating the desired signal it is out of phase with the data modulating the identifier in the multiplier 58 and, thus, cannot collapse the signal and everything but the in-phase carrier will be eliminated by the filter 65.

The pure in-phase carrier at the output of the filter 65 is amplified linearly in the amplifier 67 so that the output thereof is directly proportional to the amplitude of the input. The pure in-phase carrier from the filter 65 is also amplified in the amplifier 68, but this amplifier is set to provide an output generally dependent upon the maximum lobe available in the system. The output of the amplifier 68 is applied to a negative input of the subtractor 70 so that the signal fed back to the correlators 40, 45 and, hence, the weighters 42, 47 tends to adjust the weighters 42, 47 so as to direct a lobe so that the output of the amplifier 67 equals the output of the amplifier 68. It is generally desirable to adjust the AGC amplifier 68 so that the output thereof is always at least slightly greater than the output of the linear amplifier 67. In this fashion the weighters 42 and 47 will always direct the greatest possible lobe in the direction of the desired signal. The pure carrier output signal from the subtractor 70 is modulated in the multiplier 71 by the delayed data from the buffer 61, which is in-phase with the data of the desired signal, and the locally generated random code from the generator 55 so that the output of the multiplier 71 is identical with the transmitted desired signal. Thus, the system will direct a lobe in the direction of the desired signal and the majority of power in the desired signal will be subtracted off by the system. The identifier signal, transmitted with the desired signal, is not subtracted off by the system but its power level is small compared to the desired signal power.

Thus, a communications system including a multiple antenna array with null steering apparatus connected thereto is disclosed wherein the null steering apparatus includes apparatus and a method for directing a lobe toward a desired signal having a negative signal to noise ratio so that a usable output can be obtained. Further, a reference signal is generated which is identical with the desired signal so that the lobe is accurately directed toward the desired signal and the maximum amount of power is subtracted off of the desired signal in the system. While the present apparatus is disclosed in conjunction with a specific communication system, it should be understood that the scope of the invention might be used in apparatus to provide a predetection combining function on signals buried in noise as well as many other functions and apparatus. Accordingly, while I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

What is claimed is:

1. A communications system comprising:

(a) a transmitter for transmitting a desired signal and an identifier signal, simultaneously, said transmitter including:

(1) oscillator means for providing a carrier with means coupled thereto for providing a first carrier and a second carrier in phase quadrature with the first carrier, (2) random code generating means providing a predetermined random code, (3) input means for receiving bits of data and providing a data output and including delay means for delaying the bits of data a predetermined amount and providing a delayed data output, and (4) modulating means coupled to receive the first and second carriers, the random code, and the data and delayed data outputs, and providing the desired signal, including the first carrier modulated with the delayed data and the random code, and the identifier signal, including the second carrier modulated with the data and the random code and reduced in amplitude a predetermined amount; and (b) a receiver having a multiple antenna array connected thereto for receiving the desired signal and the identifier signal from said transmitter, said receiver including:

(1) feedback means associated with each antenna in said array for adjusting the amplitude and phase of signals therein so that unwanted signals from the array are cancelled, (2) random code generating means for providing an output signal substantially similar to the random code modulating the carrier of the desired signal, (3) demodulation means coupled to said feedback means and to said random code generating means for providing output signals corresponding with the first carrier, the delayed bits of data from the desired signal, and the bits of data from the identifier signal, (4) delay means coupled to said demodulator means for receiving the bits of data from the identifier signal and delaying the bits to correspond with the data bits of the transmitted desired signal, (5) modulation means coupled to said random code generating means, said demodulation means and said delay means for providing an output signal which corresponds with the transmitted desired signal, and (6) combining means coupled to said feedback means and said modulation means for utilizing the output signal from said modulation means to adjust a lobe in the antenna pattern in the direction of the desired signal.

2. A communications system as claimed in claim 1 wherein the demodulation means includes a first mixing device for removing the random code modulation from the desired signal and the identifier signal, filtering means for allowing the passage of only the desired signal and the identifier signal without random code modulation, a second mixing device for removing the data modulation from the carrier of the desired signal, and filtering means for allowing the passage of only the unmodulated carrier.

3. A communications system as claimed in claim 2 wherein the demodulation means further includes first amplification means connected to receive the unmodulated carrier and provide an output signal having an amplitude directly proportional to the amplitude of the signal applied to the demodulation means, second amplification means with automatic gain control connected to receive the unmodulated carrier and provide an output signal having an amplitude which is substantially preset in accordance with the maximum lobe available in the system, and means for combining the output signals from said first and second amplification means and supplying a carrier signal to the receiver modulation means.

4. In a multiple antenna array, null steering apparatus for reception of a desired signal wherein an identifier signal is transmitted with the desired signal, the desired signal including a first carrier modulated with bits of data delayed a predetermined period and with a random code, the identifier signal being substantially reduced in amplitude relative to the desired signal and including a second carrier in phase quadrature with the first carrier and modulated with the bits of data and with the random code, said null steering apparatus comprising:

(a) feedback means associated with each antenna in said array for adjusting the amplitude and phase of signals therein so that unwanted signals from the array are cancelled;

(b) random code generating means for providing an output signal substantially similar to the random code modulating the carrier of the desired signal;

(c) demodulation means coupled to said feedback means and to said random code generating means for providing output signals corresponding with the first carrier, the delayed bits of data from the desired signal, and the bits of data from the identifier signal;

(d) delay means coupled to said demodulator means for receiving the bits of data from the identifier signal and delaying the bits to correspond with the data bits of the transmitted desired signal;

(e) modulation means coupled to said random code generating means, said demodulation means and said delay means for providing an output signal which corresponds with the transmitted desired signal; and (f) combining means coupled to said feedback means and said modulation means for utilizing the output signal from said modulation means to adjust a lobe in the antenna pattern in the direction of the desired signal.

5. In a multiple antenna array, null steering apparatus for reception of a desired signal with a negative signal-to-noise ratio wherein an identifier signal is transmitted with the desired signal, the desired signal including a first carrier modulated with bits of data delayed a predetermined period and with a random code, the identifier signal being substantially reduced in amplitude relative to the desired signal and including a second carrier in phase quadrature with the first carrier and modulated with the bits of data and with the random code, and null steering apparatus comprising:

(a) feedback means associated with each antenna in said array for adjusting the amplitude and phase of signals therein so that unwanted signals from the array are cancelled, said feedback means including a first path through which unwanted signals are free to pass and a second path;

(b) random code generating means for providing an output signal substantially similar to the random code modulating the carrier of the desired signal;

(c) first mixing and filtering means connected in said second feedback path and to said random code generating means for allowing the passage of only the desired and identifier signals and removing the random code modulation therefrom;

(d) quadrature demodulation means connected to said second feedback path for providing the delayed bits of data from the desired signal on a first output and the bits of data from the identifier signal on a second output;

(e) delay means coupled to the second output of said quadrature demodulation means for delaying the bits of data to correspond with the bits of data of the transmitted desired signal;

(f) second mixing and filtering means connected in said second feedback path and further connected to receive the bits of data for substantially removing the remaining modulation on the carrier of the desired signal to provide a substantially pure carrier signal;

(g) first linear amplifying means coupled to said second mixing and filtering means for amplifying the output carrier signal;

(h) second amplifying means including automatic gain control circuitry preadjusted substantially in accordance with the maximum lobe available in the system, said amplifying means being coupled to said second mixing and filtering means for amplifying the output carrier signal;

(i) means coupled to said first amplifying means and said second amplifying means for combining the carrier signals therefrom so as to provide an output signal tending to cause said feedback means to form a lobe in the antenna pattern; and (j) modulating means coupled to receive the output signal from said combining means, the random code from said random code generating means and the delayed bits of data from the delay means for providing a reference signal substantially identical to the desired signal, and further coupled to said feedback means so that the lobe formed in the antenna pattern is directed in the direction of the desired signal.

6. Null steering apparatus as claimed in claim 5 wherein the means for combining the carrier signals includes a subtracting circuit providing an output carrier signal approximately equal to the difference in amplitude between the signals provided by the first and second amplifying means.

7. In conjunction with a multiple antenna array having attached thereto null steering apparatus for reception of a desired signal with a negative signal-to-noise ratio wherein an identifier signal is transmitted with the desired signal, the desired signal including a first carrier modulated with bits of data delayed a predetermined period and with a random code, the identifier signal being substantially reduced in amplitude relative to the desired signal and including a second carrier in phase quadrature with the first carrier and modulated with the bits of data and with the random code, a method of null steering the array comprising the steps of:

(a) removing the random code modulation from the first and second carriers and providing a random code output;

(b) demodulating the first and second carriers to obtain the bits of data from the first carrier at an output terminal, the bits of data from the second carrier delayed a predetermined amount, and the recovered first carrier;

(c) supplying the recovered first carrier through a linear amplifier to a combining device;

(d) supplying the recovered first carrier through an AGC amplifier to the combining device;

(e) remodulating the combined carrier output of the combining device with the delayed bits of data and with the random code output;

(f) utilizing the remodulated carrier to adjust the null steering apparatus to form a lobe in the antenna pattern in the direction of the desired signal; and (g) adjusting the AGC amplifier and the combining device to maximize the lobe directed toward the desired signal.

8. In a communications system including a transmitter and a receiver with a multiple antenna array having null steering apparatus attached thereto with feedback circuitry for directing nulls in the array pattern in the direction of unwanted signals, a method of directing a lobe in the array pattern in the direction of a desired signal comprising the steps of:

(a) transmitting a desired signal including a first carrier modulated with bits of data delayed a predetermined period and with a random code and an identifier signal substantially reduced in amplitude relative to the desired signal and including a second carrier in phase quadrature with the first carrier and modulated with the bits of data and with the random code;

(b) receiving the transmitted signals in the receiver;

(c) removing the random code modulation from the first and second carrier and providing a random code output;

(d) demodulating the first and second carriers to obtain the bits of data from the first carrier at an output terminal, the bits of data from the second carrier delayed a predetermined amount, and the recovered first carrier;

(e) supplying the recovered first carrier through a linear amplifier to a combining device;

(f) supplying the recovered first carrier through an AGC amplifier to the combining device;

(g) remodulating the combined carrier output of the combining device with the delayed bits of data and with the random code output;

(h) utilizing the remodulated carrier to adjust the null steering apparatus to form a lobe in the array pattern in the direction of the desired signal; and (i) adjusting the AGC amplifier and the combining device to maximize the lobe directed toward the desired signal.

* * * * *